United States Patent
Dunn et al.

[19]

[11] Patent Number: 5,825,954
[45] Date of Patent: Oct. 20, 1998

[54] SUBMERSIBLE FIBER OPTICS LENS ASSEMBLY

[75] Inventors: Dennis C. Dunn, Thousand Oaks; Richard L. Swain, Simi Valley, both of Calif.

[73] Assignee: American Products, Inc., Moorpark, Calif.

[21] Appl. No.: 731,796

[22] Filed: Oct. 18, 1996

[51] Int. Cl.⁶ ..................................................... G02B 6/36
[52] U.S. Cl. ................................................. 385/79; 385/81
[58] Field of Search ................................. 385/58, 60–62, 385/70, 72, 74, 77–79, 81

[56] References Cited

U.S. PATENT DOCUMENTS

| | | | |
|---|---|---|---|
| 4,190,316 | 2/1980 | Malsby et al. | 385/61 |
| 4,606,603 | 8/1986 | Cairns | 385/58 |
| 4,616,900 | 10/1986 | Cairns | 385/58 X |
| 4,682,848 | 7/1987 | Cairns et al. | 385/72 X |
| 4,770,488 | 9/1988 | Shank et al. | 385/79 |
| 4,782,430 | 11/1988 | Robbins et al. | 362/32 |
| 5,305,407 | 4/1994 | Monroe et al. | 385/89 |
| 5,528,714 | 6/1996 | Kingstone et al. | 385/100 |

OTHER PUBLICATIONS

Understanding Fiber Optics, Second Edition, 1993, Jeff Hecht, pp. 235–236. (Sams Publishing) (No Month Avail.).

*Primary Examiner*—John D. Lee
*Attorney, Agent, or Firm*—Pretty, Schroeder & Poplawski

[57] ABSTRACT

A submersible fiber optic lens assembly for use with a fiber optic cable having an end. The assembly includes a lens cap having a lens plate, a seal nut threadedly received within the lens cap, an O-ring radially sealing between the lens cap and the seal nut, a grommet received within the seal nut, and a compression nut received within the seal nut adjacent the grommet such that the grommet may be axially compressed between the seal nut and the compression nut to form a seal between the jacket and the seal nut. The fiber optic cable has a jacket, the jacket being received within the grommet prior to compression of the grommet. The lens plate has a reservoir formed on an inside surface, with a globule of gel located in the reservoir. Upon assembly, the end of the fiber optic cable is received within the gel. The O-ring seal and the grommet seal form an water tight cavity which is further defined by the reservoir and the seal nut. The cavity is filled by the gel.

16 Claims, 6 Drawing Sheets

SUBMERSIBLE FIBER OPTICS LENS ASSEMBLY

BACKGROUND OF THE INVENTION

This invention relates generally to fiber optic pool lighting systems and, more particularly, to a submersible fiber optic lens assembly.

Pool lighting systems must be designed to provide a significant amount of light, and yet be safe from contamination and/or damage from the effects of exposure to water. Fiber optic light systems allow a light source to be located away from a pool's body of water, and thus provide for a safe distance between electrical components and the water. In a fiber optic light system, the light from the light source is directed to the pool through a fiber optic cable that includes one or more optical fibers. Upon the light's arrival at the pool, a fiber optic lens assembly is used to disperse the light into the pool water. This lens assembly preferably includes a lens piece located adjacent the end of the fiber optic cable to aid in dispersal of the light. It is preferable for this lens assembly and the end of the cable to be located below the water's surface to avoid reflection of the light from the ends of the optical fibers off of the water's surface, and to improve the appearance of the pool. It is also preferable for a lens assembly to accept a variety of fiber optic cable sizes so as to minimize the cost and difficulty of maintaining a supply of lens assemblies.

To maximize delivery of light from the fiber optic cable to the pool, a fiber optic lens assembly must contend with two problems. First, given that a small gap inevitably exists between the ends of the optical fibers at the end of the fiber optic cable, and the lens piece, algae will form and block the passage of light if water is present in that gap. Second, if air is maintained in the gap, light passing from the fiber optic cable to the air, and from the air to the lens piece loses a significant amount intensity due to reflection.

This second problem is related to the indices of refraction of the optical fibers, the lens piece, and the air. Air has an index of refraction of essentially 1.00, while common optical transmitting materials such as optical fibers and lens pieces have an index of refraction in the vicinity of 1.5. Every time light passes between substances having different indices of refraction, a portion of the light is lost to reflection. The light in an optical fiber is continuously reflecting back and forth between walls of the optical fiber. When the light reaches an end of the optical fiber, a large percentage of the light will cross the end at a sharp angle to the direction normal to the optical fiber end. Generally, the proportion of light passing between materials that is reflected is significantly greater for light that does not pass in a direction normal to a boundary between the materials. Thus, the rays of the light must pass from the 1.5 index optical fibers to the air (with a 1.0 index), and then to the 1.5 index lens piece, and they must do so at angles that are not normal to the boundaries. The light therefore loses a significant amount of intensity due to reflection.

It is generally known to couple optical fibers in front of a light source by using an axially compressed grommet around the fibers. Using such a system provides for light loading into the optical fibers in a fiber optic cable from a light source. It is also generally known to run the fiber optic cable down a conduit that opens into a side of a pool. An end of the fiber optic cable is held adjacent to a lens piece by a lens assembly that includes the lens piece. The lens piece is received within a standard pool inlet fixture that is fitted over the conduit's opening into the pool side. The lens assembly is sealed to the pool light fixture using an axial O-ring, and the pool light fixture is in turn sealed to the pool wall. Water is thus generally prevented from seeping into the conduit from the pool, and the light may pass from the fiber optic cable, through an air gap between the fiber optic cable's end and the lens piece, and then through the lens piece.

This generally known system suffers the reflection problems discussed above, causing a loss of light intensity between the cable and the lens piece. Furthermore, while the system initially is water tight, it is common for water to eventually find its way into the conduit. The water may slip past one of the seals between the pool and conduit, or water may find its way in from another source, such as rain or splash water entering another part of the conduit. Once the water has seeped in to the conduit, the lens assembly may become contaminated with water (and thus with algae) in the region of the fiber optic cable's end and lens piece, and the light may be thus obstructed.

In an attempt to overcome the difficulty of algae contamination from water in the conduit entering a rear portion of the lens assembly, an attempt has been made to seal the optical fiber ends and the adjoining lens piece surface within the lens assembly. This attempt included stripping the jacket from the fiber optic cable to expose the optical fibers, and using a gripping device or a hardening resin to hold and center the unjacketed fibers in the lens body. While this method may generally block passage of water into the lens assembly, it does not prevent a low level of seepage between the optical fibers and into the lens assembly, thus causing the aforementioned problems.

Accordingly, there has existed a definite need for a fiber optic cable lens assembly that is submersibly water tight, and that minimizes the reflection of light as the light passes from the fiber optic cable to a lens piece. There is a further need for the lens assembly to efficiently receive a variety of fiber optic cable sizes with a minimum of difficulty. The present invention satisfies these and other needs, and provides further related advantages.

SUMMARY OF THE INVENTION

The present invention provides a submersible fiber optic lens assembly for receiving a fiber optic cable with an end, and a fiber optic light. It provides for a water tight assembly that minimizes losses due to the reflection of light as the light passes from the fiber optic cable to a lens piece. The There is a further need for the lens assembly to efficiently receive a variety of fiber optic cable sizes with a minimum of difficulty.

The invention comprises a lens body having an inner surface that defines a chamber within the lens body. The chamber has an opening for inserting a fiber optic cable. The lens body in turn includes a lens plate.

A feature of the invention is that it may further comprise a grommet and a compression nut. The grommet includes a first end portion, a second end portion, and a bore for receiving the fiber optic cable when an embodiment of the invention is assembled. The first end portion of the grommet is configured to be axially received within the chamber against the lens body's inner surface upon assembly. The compression nut includes an end portion and a cylindrical outer surface having threads. The compression nut also defines a bore for receiving the fiber optic cable upon assembly.

The lens body includes a threaded portion for engaging the compression nut's threaded portion upon assembly so as to abut the compression nut's end portion against the grommet's second end portion when the assembly is assembled with the fiber optic cable. The grommet may thus be axially compressed between the compression nut's end and the lens body's inner surface, forming a water tight seal between the lens body's inner surface and the fiber optic cable and forming a water tight cavity within the chamber. The lens plate is optically linked to the cavity such that light from the cavity may be emitted from the lens body through the lens plate.

An advantage of this feature is that it provides a sealed cavity for protecting the optical connection between the fiber optic cable and the lens plate. This connection prevents contamination by water, and thus contamination by algae. Another advantage of this feature is that it holds and centers the fiber optic cable in the proper position for the lens plate.

Another feature of the invention is that the assembly further comprises a globule of gel for optically connecting the end of the fiber optic cable to the lens plate. The gel is located within the cavity on an inner surface of the lens plate upon assembly of the lens assembly. Preferably, the gel has an index of refraction approximately between the index of refraction of the lens plate and the index of refraction of the active core of optical fibers within the fiber optic cable. An advantage of this feature is that the gel optically connects the optical fibers (and thus the fiber optic cable) to the lens plate to significantly reduce the reflection of light, and thus the reduction of the intensity of transmitted light.

The invention also features a reservoir formed on the lens plate inner surface. The reservoir contains the globule of gel, reducing the amount of gel necessary in the assembly. The reservoir also serves as an assembly guide for indicating the necessary amount of gel to use.

Another useful feature of the invention is that the lens body may comprise a lens cap, a seal nut, and an O-ring. The lens cap includes the lens plate, and also a flange extending from around a perimeter of the lens plate. The lens cap includes a mechanical locking mechanism such as threads or a key lock. The seal nut forms a hollow cylinder, and receives the lens cap. The seal nut includes a mechanical locking mechanism configured to lock with the lens cap locking mechanism. The lens cap and seal nut are configured to radially hold the O-ring so as to form a water tight seal between the lens cap and seal nut upon assembly.

An advantage of this feature is that the seal nut, grommet, and compression nut may be assembled with the fiber optic cable prior to the assembling of the lens cap.

This allows the optical fibers to be trimmed to extend from the jacket by an amount correct to extend into the gel and reservoir upon assembly. Another advantage of this feature is that the assembly of the lens cap after the seal nut, grommet, and compression nut, minimizes the handling of the lens cap once it contains the gel.

Other features and advantages of the invention will become apparent from the following detailed description, taken in conjunction with the accompanying drawings, which illustrate, by way of example, the principles of the invention.

DESCRIPTION OF THE PREFERRED EMBODIMENT

Figure 1:
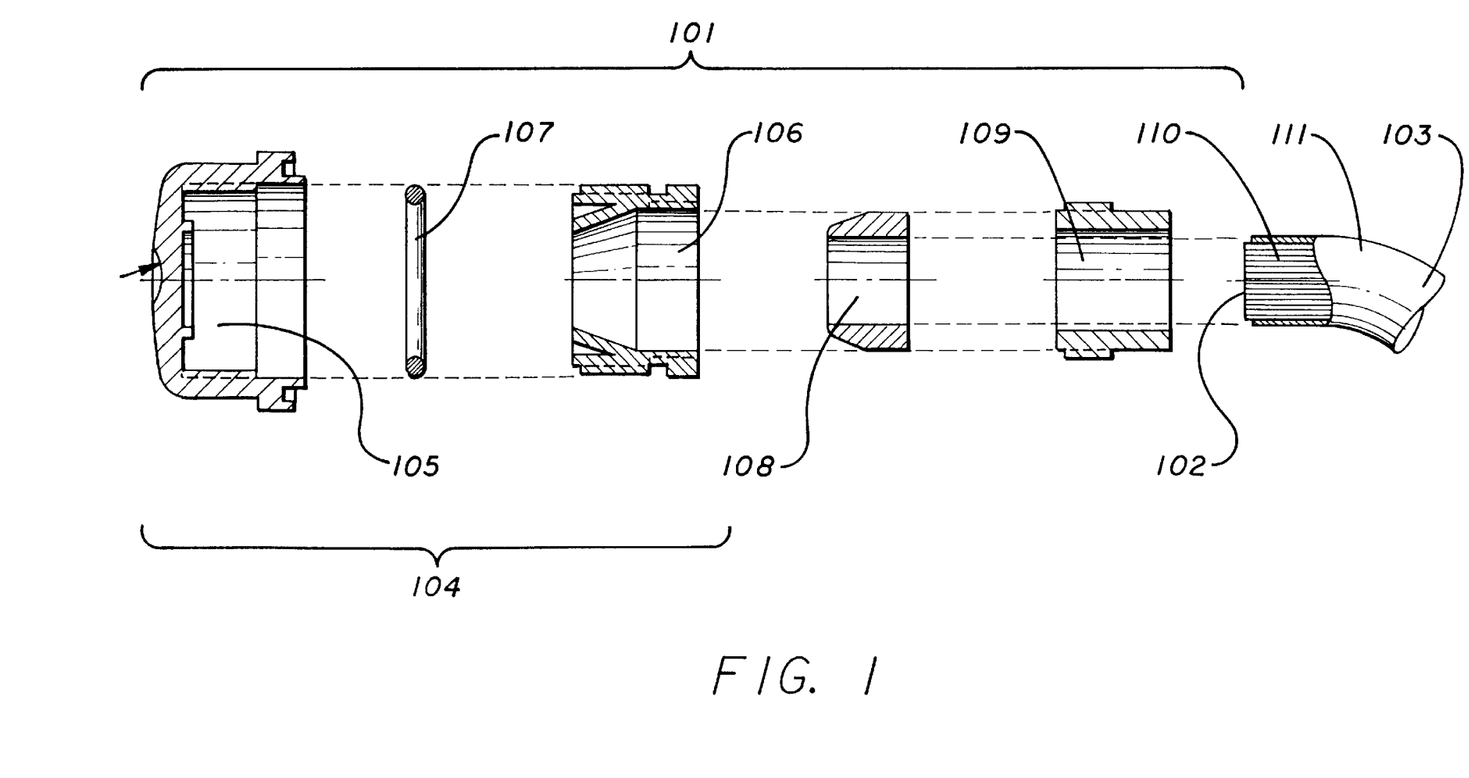
FIG. 1 is an exploded cross-sectional view of a submersible fiber optic lens assembly and a fiber optic cable embodying features of the present invention.
Figure 2A:
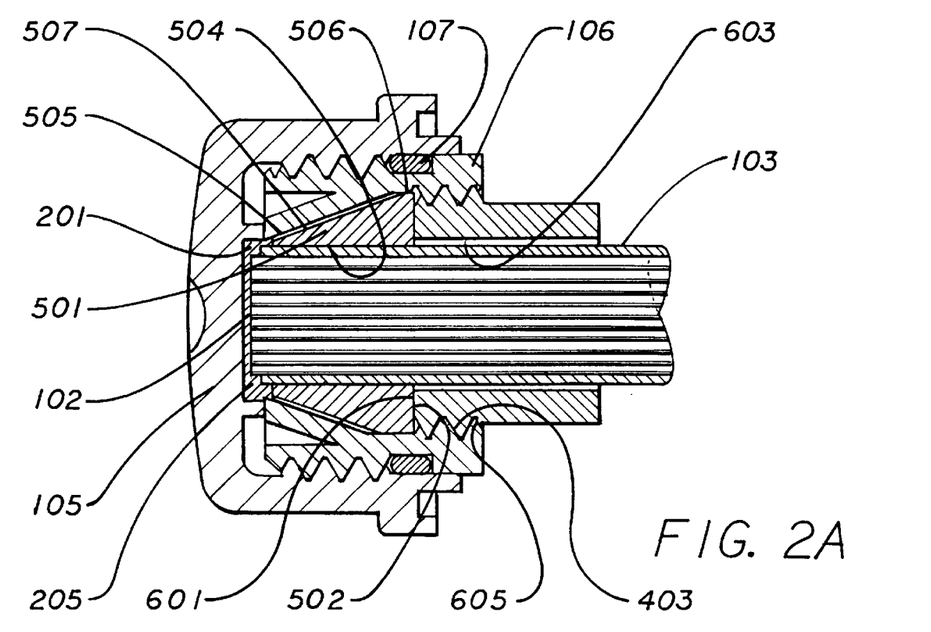
FIG. 2A is an assembled cross-sectional view of the submersible fiber optic lens assembly and a fiber optic cable depicted in view 1.
Figure 2B:
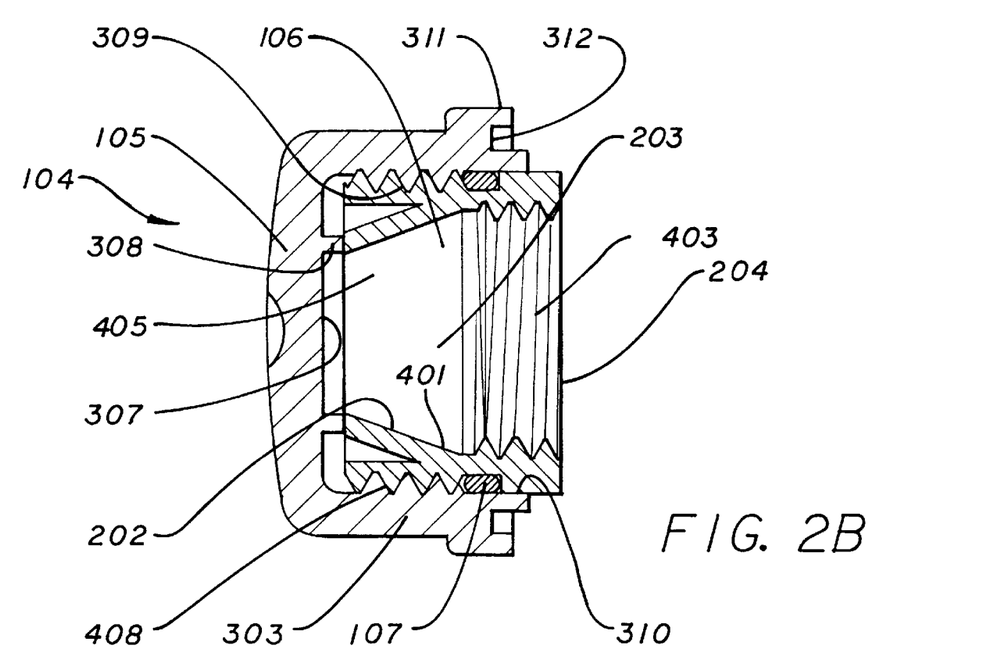
FIG. 2B is a lens body as depicted in view 2A.

A submersible fiber optic lens assembly 101 for receiving an end 102 of a fiber optic cable 103 according to the present invention is shown in FIGS. 1, 2A and 2B. The assembly is designed to efficiently receive light from the fiber optic cable and disperse it into a body of water such as a pool or spa, while protecting the end of the fiber optic cable from contamination. The assembly includes a lens body 104 comprising a lens cap 105 receiving a seal nut 106, with an O-ring 107 held radially between the lens cap and the seal nut. The assembly also includes a grommet 108 and a compression nut 109. The assembly may accept a variety of fiber optic cable sizes through the use of varying sized grommets. Preferably, the fiber optic cable includes a plurality of optical fibers 110 contained within a jacket 111, however the invention is applicable to other fiber optic cables such as a single optical fiber or a plurality of optical fibers, not contained within a jacket. The fiber optic cables are available from a variety of sources, and are preferably acrylic.

Figure 3A:
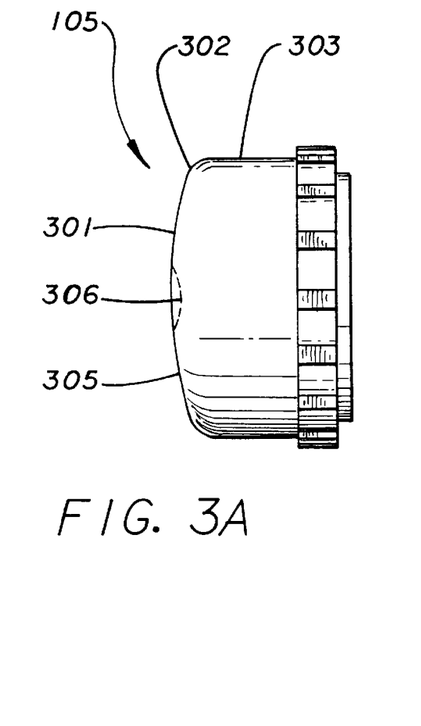
FIGS. 3A and 3B are side and end elevational views, respectively, of a lens cap depicted in FIG. 1.
Figure 3B:
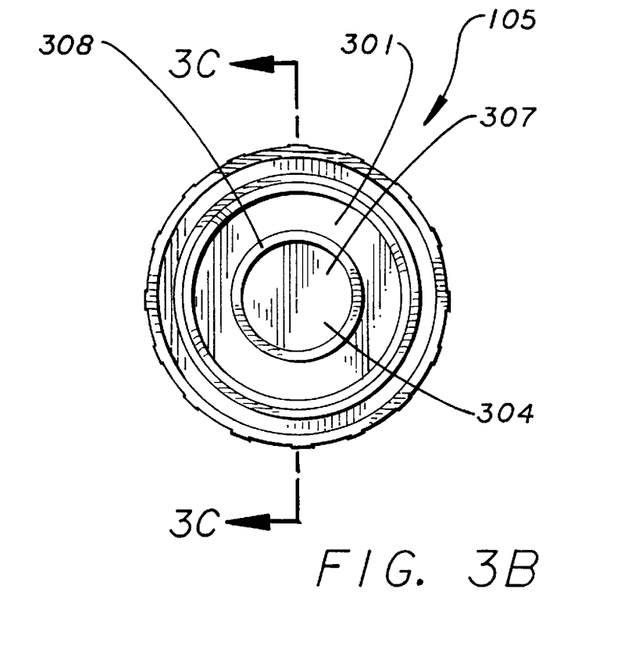
Figure 3C:
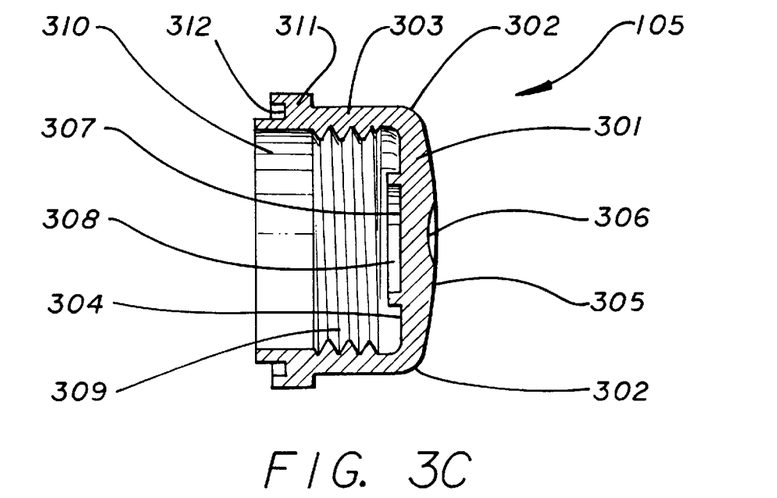
FIG. 3C is a cross-sectional side view of the lens cap depicted in FIGS. 3A and 3B, taken along line 3—3 of FIG. 3B.

With reference to FIGS. 3A, 3B and 3C, the lens cap 105 is a bowl shaped device. A round lens plate 301 forms the bottom of the bowl shape, having a circular perimeter 302. A material that passes light, preferably polycarbonate, is used to form the lens plate. A flange 303 extends from around the perimeter of the lens plate, forming the sides of the bowl shape. The flange is generally shaped as a hollow cylinder extending in a direction normal to the plane of the lens plate. The flange is preferably unitary with the lens plate.

Referring back to FIG. 2A, the assembly 101 may include a globule of gel 201. The gel is preferably a non water-soluble (either hardening or non-hardening) gel, and is most preferably a silicon based gel. Also, the gel is preferably as close to transparent as possible.

Importantly, the gel is preferably selected with an index of refraction approximately between the index of refraction of the lens plate and the index of refraction of the fiber optic cable. For commonly preferred fiber optic and lens plate materials, a preferred index of refraction range would be approximately 1.40 to 1.55. In the case of optical fibers with varying indices of refraction, such as those with cladding, the relevant index of refraction is that of the core section that transmits the majority of the light.

Without the use of the gel, as discussed in the Background of the Invention, light would pass from optical fiber ends to air in a gap adjacent the optical fiber ends, and then from the air to the lens plate. The gel provides a medium, other than air, to optically connect the optical fibers to the lens plate. The gel's preferred index of refraction, being close to that of the optical fibers and the lens plate, minimizes reflectance and maximizes transmittance when light passes from the optical fibers to the gel, and again when the light passes from the gel to the lens plate. Because reflectance, as a function of the indexes of refraction ratio, is a non-linear function of increasing slope in the relevant range, it is most preferred that the gel's index of refraction be the average of the optical fiber's index of refraction and the lens plate's index of refraction.

Returning to FIGS. 3A, 3B and 3C, the lens plate 301, which is designed to emit and disperse light into the body of water, has an inner surface 304 and an outer surface 305. The lens plate, being capable of passing light, optically links the two sides of the lens plate. The outer surface is generally convex, however it forms a concave dimple 306 in its center to improve the dispersion of light. The inner surface is generally flat. A circular reservoir 307 is formed in the middle of the inner surface by a circular retaining wall 308 protruding from the inner surface. This reservoir is configured to hold the globule of gel 201, which in turn receives the fiber optic cable end 102 (as shown in FIG. 2A). The preferred reservoir is augmented by a portion of the seal nut 106, as described below. Alternative reservoirs may be formed from, for example, depressions in the inner face, the lens cap flange 303, or even protrusions from other parts of the assembly 101 such as the seal nut.

As seen in FIGS. 2B and 3C, the lens cap flange 303 includes an inner threaded portion 309 that serve as a mechanical locking mechanism to attach the lens cap 105 to the seal nut 106. Other locking mechanisms, such as key locks, may also be used. The lens cap flange also includes an annular surface 310 to engage the O-ring 107 to form a watertight seal between the lens cap and the seal nut. The lens cap flange also includes a lip 311 that defines an annular groove 312 facing an axial direction. This groove is configured to receive an O-ring (not shown) and the lip is further configured to be received in a standard pool inlet fixture (not shown).

Figure 4A:
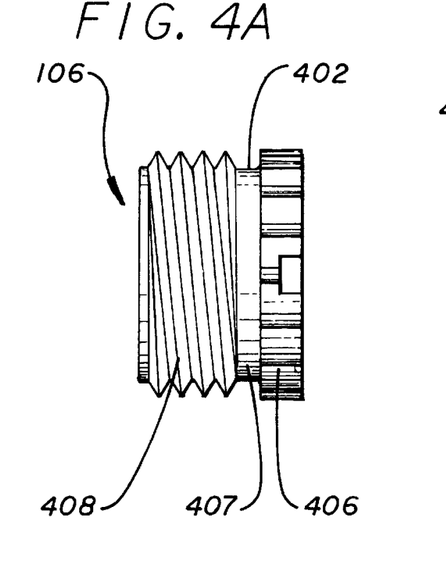
FIGS. 4A and 4B are side and end elevational views, respectively, of a seal nut depicted in FIG. 1.
Figure 4B:
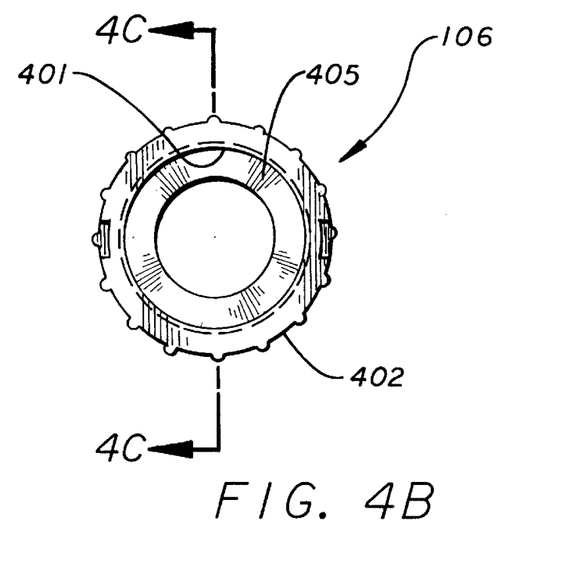
Figure 4C:
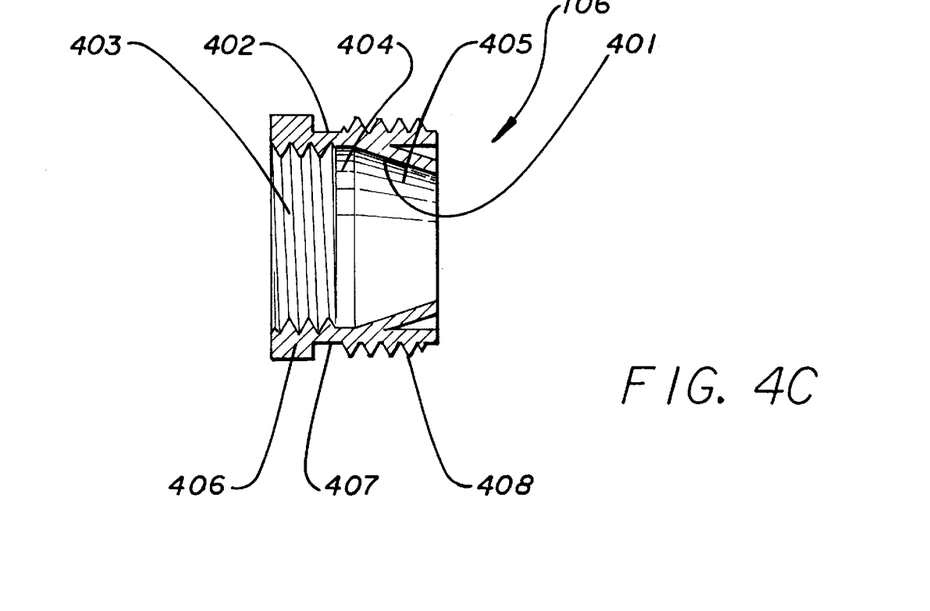
FIG. 4C is a cross-sectional side view of the lens cap depicted in FIGS. 4A and 4B, taken along line 4—4 of FIG. 4B.

Referring now to FIGS. 4A, 4B and 4C, the seal nut 106 is generally formed in the shape of a hollow cylinder having an inner surface 401 and an outer surface 402. The inner surface of the seal nut includes a threaded portion 403, a cylindrical portion 404, and a conically tapered portion 405. The outer surface of the seal nut forms a raised annular portion 406, an annular groove 407, and a threaded portion 408.

As seen in FIG. 2B, the outer surface threaded portion 408 serves as a mechanical locking mechanism to lock with the lens cap locking mechanism (threaded portion 309) when the lens cap 105 is received upon the seal nut for assembly. Other locking mechanisms, such as key locks, may also be used on the lens cap and seal nut. The raised annular portion and the annular groove are configured to engage and axially maintain the O-ring 107 in a position radially between the seal nut and the lens cap.

The tapered portion 405 tapers down to a size such that it conforms to the retaining wall 308 forming the reservoir 307 when the lens cap 105 is received onto the seal nut 106 for assembly. The tapered portion is thus large enough to allow the fiber optic cable 103 to be received in the reservoir (as seen in FIG. 2A), and long enough to contact the retaining wall to augment the reservoir.

The lens body 104 (FIG. 2B), including the lens cap 105, the O-ring 107, and the seal nut 106, thus has an inner surface 202 that includes the seal nut inner surface 401 and the reservoir 307. The lens body inner surface defines a chamber 203 within the lens body. The chamber has an opening 204, defined by the seal nut inner threaded portion 403, for the insertion of the fiber optic cable 103 into the chamber.

Figures 5A, 5B:
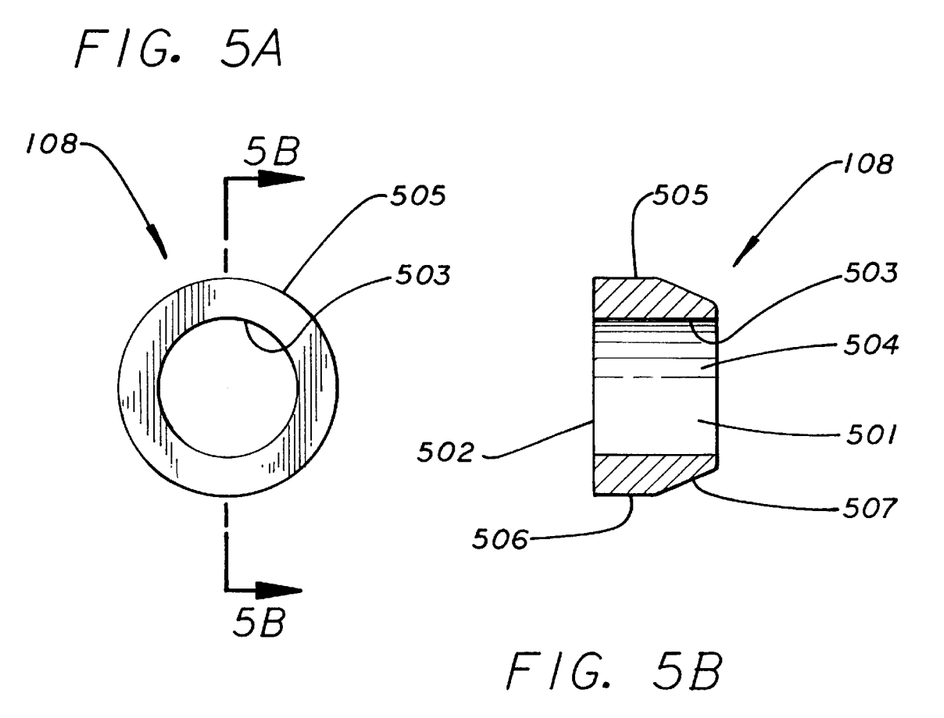
FIG. 5A is an end elevational view of a grommet depicted in FIG. 1.
FIG. 5B is a cross-sectional side view of the grommet depicted in FIG. 5A, taken along line 5—5 of FIG. 5A.

With reference to FIGS. 5A and 5B, the grommet 108 is in the general shape of a hollow cylinder. The grommet is preferably injection molded from an elastomeric material such as Santoprene®. The grommet includes a first end portion 501, a second end portion 502, and a cylindrical inner surface 503 defining a bore 504. The grommet also includes an outer surface 505 with a cylindrical portion 506 and a tapered portion 507. The first end portion includes the outer surface tapered portion and a portion of the inner surface.

Referring again back to FIGS. 2A and 2B, the first end portion 501 of the grommet 108 is configured to be axially received within the chamber 203 of the lens body 104 upon assembling the assembly 101. The outer surface 505 of the grommet is received against the lens body's inner surface 202 with the grommet outer surface's tapered portion 507 adjoining the seal nut's conically tapered surface 405, and the grommet outer surface's cylindrical portion 506 loosely conforming to the seal nut inner surface's cylindrical portion 404. The grommet's bore 504 is sized to loosely conform to the jacket 111 of the fiber optic cable 103, which is received within the bore upon assembling the assembly.

Figure 6A:
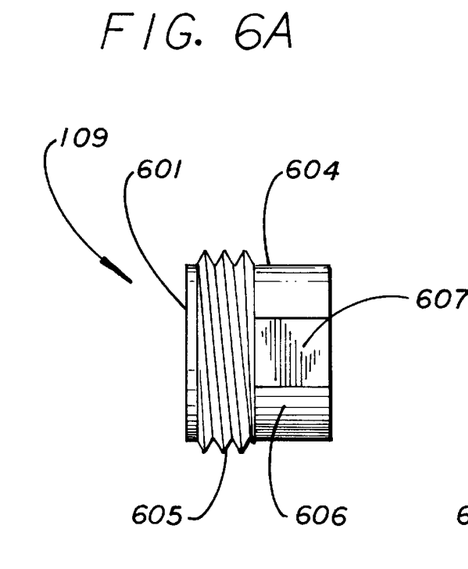
FIGS. 6A and 6B are side and end elevational views, respectively, of a compression nut depicted in FIG. 1.
Figure 6B:
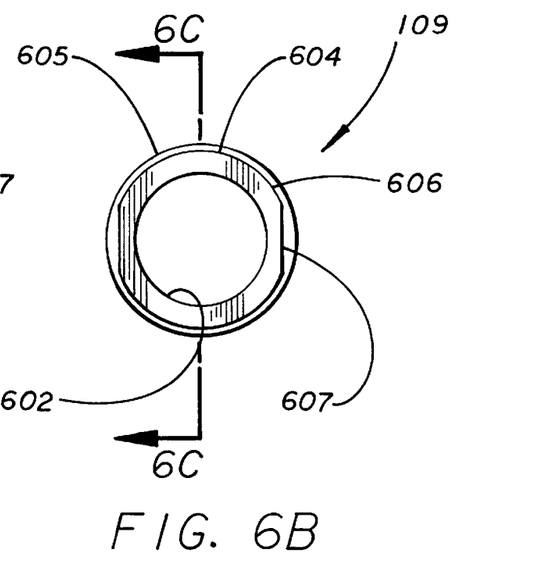
Figure 6C:
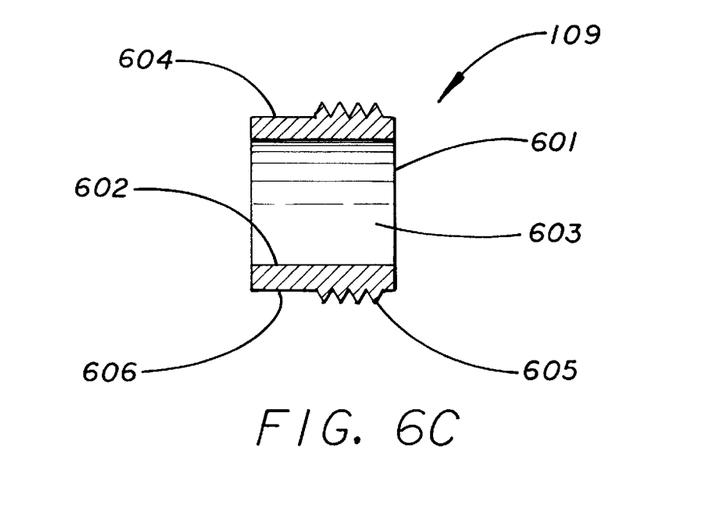
FIG. 6C is a cross-sectional side view of the grommet depicted in FIGS. 6A and 6B, taken along line 6—6 of FIG. 6B.

Turning to FIGS. 6A, 6B and 6C, the compression nut 109 is generally shaped as a hollow cylinder. The compression nut includes an end portion 601, an inner surface 602 defining a bore 603, and an outer surface 604. The outer surface has a threaded portion 605, and a cylindrical portion 606 that includes flat sections 607 configured to be gripped by a wrench. The outer surface threaded portion lies between the outer surface cylindrical portion and the end portion.

Referring again back to FIG. 2A, the compression nut's bore 603 is sized to loosely receive the fiber optic cable 103 upon assembling the assembly. The compression nut outer surface's threaded portion 605 is configured to engage the inner threaded portion 403 of the seal nut 106, which is a part of the lens body 104. With the compression nut's threaded portion so engaged upon assembling the assembly, the compression nut end portion 601 abuts the second end portion 502 of the grommet 108.

With reference to FIGS. 1, 2A and 2B, while numerous methods of assembly are possible, the preferred method provides for convenient assembly and a high quality connection. The first step in assembling the assembly 101 is to prepare various parts of the assembly. The fiber optic cable 103 is cut to a length slightly longer than necessary, and the jacket 111 is trimmed back from the end 102 of the fiber optic cable. The fiber optic cable is inserted through first the bore 603 of the compression nut 109 and then the bore 504 of the grommet 108. The compression nut and grommet are oriented on the fiber optic cable such that the compression nut end portion 601 may contact the grommet second end portion 502.

The second step in the preferred method is to insert the fiber optic cable 103 through the seal nut inner surface 401 with the seal nut 106 oriented such that its inner surface threaded portion 403 may receive the grommet 108 and engage the compression nut 109. The seal nut inner surface's tapered portion 405 is properly positioned around the jacket 111 such that the jacket extends through, but does not protrude from, the seal nut.

The third step in the preferred method of assembling the assembly 101 is to slide the grommet 108 up into the seal nut 106 such that the grommet tapered portion 507 abuts the seal nut inner surface's tapered portion 405.

The compression nut 109 is also slid up to the seal nut, and threaded onto the seal nut such that the compression nut's end portion 601 abuts against the grommet's second end portion 502. The compression nut is then further threaded onto the seal nut, thus axially compressing the grommet between the compression nut's end portion and the seal nut tapered portion (which is a part of the not-yet assembled lens body's inner surface). The compressed grommet expands radially, pressing inward into the fiber optic cable jacket 111, and outward into the seal nut inner surface 401. The compressed grommet thus forms a water tight seal between the not-yet assembled lens body's inner surface and the fiber optic cable. A spacing mechanism (not shown) is attached to the seal nut. A knife is used with the spacing mechanism to trim the optical fibers extending from the jacket to the proper length, as described below. The fourth step of the preferred method is to assemble the lens body 104. The O-ring 107 is stretched over the outer threaded portion 408 of the seal nut 106 and into the annular groove 407. The globule of gel 201 is placed in the lens cap's reservoir 307, and the lens cap inner threaded portion 309 is then screwed onto the outer threaded portion 408 of the seal nut until the end 102 of the fiber optic cable 103 is received in the gel. If the optical fibers were correctly cut to the right length by the knife, within a predetermined margin, the lens cap's annular surface 310 will be engaging the O-ring when the fiber optic cable is received in the gel. The margin is determined by the axial length of the annular surface, which can engage the O-ring at any position along its axial length. Because the jacket is sealed to the seal nut by the grommet, and the seal nut is sealed to the lens cap by the O-ring, a water tight cavity 205 is thus formed within the chamber 203. The cavity is further limited by the seal nut tapered surface's 405 conformingly adjoining the retaining wall 308. The cavity contains, and is filled by, the gel. The lens cap's annular surface is long enough to allow for some margin for error in the cutting of the optical fibers without causing the annular surface to fail to make proper contact with the O-ring.

The completed assembly 101 is thus ready to be attached to a standard pool inlet fixture (not shown). The lens cap annular groove 312 may be received by an O-ring (not shown) in the fixture to provide a water tight seal between the body of water and the fiber optic cable. If, however, this seal should fail, or the cable should otherwise become exposed to water, the watertight cavity within the assembly will prevent water from reaching the end of the fiber optic cable and contaminating the fiber optic cable end with algae or other contaminants. Even if the watertight seals should fail and water should get past the watertight seals, the gel will provide protection to the fiber optic cable end, avoiding contamination.

From the foregoing, it will be appreciated that the present invention provides a submersible fiber optic lens assembly that is water tight enough to be submersed, and that minimizes the reflection of light as the light passes from the fiber optic cable to a lens piece. The present invention satisfies these and other needs, and provides further related advantages.

While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

We claim:

1. A submersible fiber optic lens assembly for receiving a fiber optic cable with an end, comprising:

a lens body having an inner surface defining a chamber within the lens body, the chamber having an opening for the insertion of the fiber optic cable;

a grommet including a first end portion, a second end portion, and a bore for receiving the fiber optic cable upon assembly, wherein the first end portion of the grommet is configured to be axially received within the chamber against the lens body's inner surface upon assembly; and a compression nut including an end portion and a cylindrical outer surface having threads, the compression nut defining a bore for receiving the fiber optic cable upon assembly;

wherein the lens body includes threads for engaging the compression nut's threads upon assembly so as to abut the compression nut's end portion against the grommet's second end portion when the assembly is assembled with the fiber optic cable, and thus axially compress the grommet between the compression nut's end and the lens body's inner surface, forming a water tight seal between the lens body's inner surface and the fiber optic cable and forming a water tight cavity within the chamber; and wherein the lens body includes a lens plate that is optically linked to the cavity such that light from the cavity may be emitted from the lens body through the lens plate.

2. The submersible fiber optic lens assembly of claim 1, further comprising a globule of gel for optically connecting the end of the fiber optic cable to the lens plate, the gel being located within the cavity on an inner surface of the lens plate upon assembly.

3. The submersible fiber optic lens assembly of claim 2, wherein the lens plate inner surface forms a reservoir for containing the globule of gel.

4. The submersible fiber optic lens assembly of claim 2, wherein the globule of gel has an index of refraction approximately between the index of refraction of the lens plate and the index of refraction of at least one optical fiber contained within the fiber optic cable.

5. The submersible fiber optic lens assembly of claim 2, wherein the globule of gel has an index of refraction in the range of approximately 1.40 to approximately 1.55.

6. The submersible fiber optic lens assembly of claim 2, wherein the lens body comprises:

a lens cap including the lens plate, and a flange extending from around the lens plate perimeter, the lens cap including a mechanical locking mechanism;

a seal nut forming a hollow cylinder, for receiving the lens cap, the seal nut including a mechanical locking mechanism configured to lock with the lens cap locking mechanism upon assembly; and an O-ring;

wherein the lens cap and seal nut are configured to radially hold the O-ring so as to form a water tight seal between the lens cap and seal nut upon assembly.

7. The submersible fiber optic lens assembly of claim 6, wherein:

the lens plate inner surface forms a reservoir for containing the globule of gel; and the globule of gel has an index of refraction approximately between the index of refraction of the lens plate and the index of refraction of at least one optical fiber contained within the fiber optic cable.

8. A submersible fiber optic lens, comprising:

a fiber optic cable comprising at least one optical fiber within a jacket, the fiber optic cable having an end;

a lens unit including a lens plate, and a wall extending from the lens plate, the wall forming an opening to a chamber that ends at the lens plate, the chamber being defined by a chamber surface comprising an inner surface of the lens plate and an inner surface of the wall;

a grommet including a bore for conformingly receiving the fiber optic cable, wherein the grommet is configured to be conformingly received within the chamber by the chamber surface; and a compression nut including a first end, a second end, a cylindrical outer surface with outer threads connecting the first and second ends, and a bore for receiving the fiber optic cable, the bore passing through the first and second ends;

wherein the wall inner surface includes inner threads for conformingly receiving the compression nut's outer threads so as to abut the compression nut's first end into the grommet and thus compress the grommet between the compression nut's first end and the chamber surface to form a water tight seal between the chamber inner surface and the fiber optic cable.

9. The submersible fiber optic lens of claim 8, wherein the grommet bore is configured to conformingly receive the fiber optic cable jacket.

10. A submersible fiber optic light assembly, comprising:

a fiber optic cable with an end, wherein the fiber optic cable includes a plurality of fiber optic strands encased in a jacket;

a lens body having an inner surface defining a chamber within the lens body, the chamber having an opening for the insertion of the fiber optic cable;

a grommet including a first end portion, a second end portion, and a bore for receiving the jacket of the fiber optic cable upon assembly, wherein the first end portion of the grommet is configured to be axially received within the chamber against the lens body's inner surface upon assembly; and a compression nut including an end portion and a cylindrical outer surface having threads, the compression nut defining a bore for receiving the fiber optic cable upon assembly;

wherein the lens body's inner surface includes inner threads for conformingly receiving the compression nut's outer threads so as to abut the compression nut's end portion into the grommet and thus compress the grommet between the compression nut's end portion and the lens body's inner surface to form a water tight seal between the lens body's inner surface and the fiber optic cable, and thus a water tight cavity within the chamber that contains the end of the fiber optic cable; and wherein the lens body includes threads for engaging the compression nut's threads upon assembly so as to abut the compression nut's end portion against the grommet's second end portion when the assembly is assembled with the fiber optic cable, and thus axially compress the grommet between the compression nut's end and the lens body's inner surface, forming a water tight seal between the lens body's inner surface and the fiber optic cable jacket and forming a water tight cavity within the chamber; and wherein the lens body includes a lens plate that is optically linked to the cavity such that light from the cavity may be emitted from the lens body through the lens plate.

11. The submersible fiber optic light assembly of claim 10, wherein the lens body comprises:

a lens cap including the lens plate, and a threaded flange extending from around the lens plate perimeter;

a seal nut forming a hollow cylinder for receiving the lens cap, the seal nut including threads conforming to the lens cap threads; and an O-ring;

wherein the lens cap and seal nut are configured to radially hold the O-ring so as to form a water tight seal between the lens cap and seal nut.

12. The submersible fiber optic light assembly of claim 11, wherein the lens body further comprises a groove for receiving an O-ring to seal the lens body to an outer light socket.

13. The submersible fiber optic light assembly of claim 12, wherein the lens body is configured to axially compress the O-ring between the lens body and the outer light socket.

14. The submersible fiber optic light assembly of claim 10, further comprising a globule of gel for optically connecting the end of the fiber optic cable to the lens plate, the gel being located within the cavity on an inner surface of the lens plate.

15. The submersible fiber optic light assembly of claim 14, wherein the lens plate inner surface forms a reservoir for containing the globule of gel.

16. The submersible fiber optic light assembly of claim 14, wherein the globule of gel has an index of refraction approximately between the index of refraction of the lens plate and the index of refraction of the fiber optic cable.

* * * * *